United States Patent
Moriya et al.

(10) Patent No.: US 8,380,422 B2
(45) Date of Patent: Feb. 19, 2013

(54) CONTROL APPARATUS AND CONTROL METHOD FOR INTERNAL COMBUSTION ENGINE

(75) Inventors: Hidenori Moriya, Susono (JP);
Ryusuke Ogino, Shizuoka-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 457 days.

(21) Appl. No.: 12/680,069

(22) PCT Filed: Sep. 24, 2008

(86) PCT No.: PCT/IB2008/002478
§ 371 (c)(1),
(2), (4) Date: Jun. 3, 2010

(87) PCT Pub. No.: WO2009/040632
PCT Pub. Date: Apr. 2, 2009

(65) Prior Publication Data
US 2010/0241333 A1    Sep. 23, 2010

(30) Foreign Application Priority Data
Sep. 25, 2007    (JP) .................................. 2007-246713

(51) Int. Cl.
*F02M 51/00*    (2006.01)
*F02M 51/04*    (2006.01)
(52) U.S. Cl. ...................................... 701/103; 123/492
(58) Field of Classification Search .................. 701/101, 701/102, 103, 104, 110, 115; 123/435, 436, 123/492, 493, 480
See application file for complete search history.

(56) References Cited

U.S. PATENT DOCUMENTS

| 5,931,136 A | * | 8/1999 | Isobe et al. .................... 123/399 |
| 6,792,927 B2 | * | 9/2004 | Kobayashi ..................... 123/673 |
| 2003/0172644 A1 | | 9/2003 | Minami |
| 2004/0128985 A1 | | 7/2004 | Shimasaki et al. |
| 2005/0022503 A1 | | 2/2005 | Miura |
| 2009/0138172 A1 | * | 5/2009 | Okazaki et al. ................ 701/103 |

FOREIGN PATENT DOCUMENTS

| EP | 1 426 592 | 6/2004 |
| EP | 1 503 065 | 2/2005 |
| JP | 7 42593 | 2/1995 |
| JP | 9 317522 | 12/1997 |
| JP | 2001 241343 | 9/2001 |
| JP | 2007 32531 | 2/2007 |

* cited by examiner

*Primary Examiner* — Mahmoud Gimie
(74) *Attorney, Agent, or Firm* — Oblon, Spivak, McClelland, Maier & Neustadt, L.L.P.

(57) ABSTRACT

A primary opening amount setting device sets a primary throttle valve opening amount based on an accelerator-pedal operation amount determined by an accelerator operation amount determination device. An injection amount calculation device sets a fuel injection amount based on the primary throttle valve opening amount. A first index value determination device determines a first index value that indicates a state of combustion of an air-fuel mixture in a cylinder of an engine. A secondary opening amount setting device sets a secondary throttle valve opening amount, which is a final target value of an opening amount of a throttle valve, based on the first index value.

17 Claims, 7 Drawing Sheets

CONTROL APPARATUS AND CONTROL METHOD FOR INTERNAL COMBUSTION ENGINE

BACKGROUND OF THE INVENTION

1. Field of the Invention

The invention relates to a control apparatus and a control method for an internal combustion engine for increasing the air-fuel ratio of an air-fuel mixture in a cylinder in an appropriate range, during transient operation of the engine.

2. Description of the Related Art

Japanese Patent Application Publication No. 5-321726 (JP-A-5-321726) describes a control apparatus that determines the torque fluctuation amount of an internal combustion engine, and controls, through feedback, an air-fuel ratio of an air-fuel mixture formed in an engine cylinder to an appropriate value (lean air-fuel ratio) that is higher than the stoichiometric air-fuel ratio so that the torque fluctuation amount is equal to a target torque fluctuation amount. The control apparatus determines an intake air amount, sets a fuel injection amount based on the determined intake air amount, and changes the air-fuel ratio to a lean air-fuel ratio by changing the set fuel injection amount. More specifically, the apparatus sets a target throttle valve opening amount based on an accelerator operation amount, and makes an actual throttle valve opening amount equal to the target throttle valve opening amount. In addition, the control apparatus executes a control (hereinafter, may be referred to as "lean limit control") that changes the air-fuel ratio to the leanest possible air-fuel ratio, by decreasing the fuel injection amount while monitoring the torque fluctuation amount.

However, because the above-described control apparatus changes the air-fuel ratio to a lean air-fuel ratio by decreasing the fuel injection amount, an amount of fuel contributing to combustion is decreased when the air-fuel ratio is changed to a leaner air-fuel ratio, even if the accelerator operation amount is constant. As a result, a driver may feel discomfort due to a relatively large decrease in the torque generated by the engine. In addition, the control apparatus changes the air-fuel ratio to a lean air-fuel ratio by decreasing the fuel injection amount set based on the determined intake air amount. Accordingly, under certain conditions, the intake air amount cannot be accurately determined during transient operation of the engine, the air-fuel ratio is excessively lean and therefore, a misfire occurs, or combustion is unstable and the torque greatly fluctuates although a misfire does not occur. Thus, the control apparatus executes the lean limit control, only when an engine load is relatively low, and the engine is in a steady operating state. As a result, the engine operating state, in which the air-fuel ratio can be set to a lean air-fuel ratio, is limited. Therefore, it is difficult to further improve fuel economy.

SUMMARY OF THE INVENTION

The invention provides a control apparatus and a control method for an internal combustion engine, which make an air-fuel ratio lean, while stabilizing the engine operating state (the state of combustion of an air-fuel mixture), when the engine is in a transient operating state, as well as when the engine is in a steady operating state.

A first aspect of the invention relates to a control apparatus for an internal combustion engine. The control apparatus includes an accelerator operation amount determination device that determines an accelerator operation amount; an injection amount setting device that sets a fuel injection amount based on the determined accelerator operation amount; and a fuel injection device that injects fuel in the set fuel injection amount.

That is, with the control apparatus, fuel in an amount corresponding to the accelerator operation amount is injected. The expression "fuel in the amount corresponding to the accelerator operation amount" may indicate, for example, the amount of fuel required for the engine to generate torque required of the engine (required engine torque), which is set based on at least the accelerator operation amount. Alternatively, the fuel in the amount corresponding to the accelerator operation amount may be the amount of fuel that is set to achieve a predetermined target air-fuel ratio (for example, the stoichiometric air-fuel ratio), based on the predetermined target air-fuel ratio, and an amount of air taken into an engine cylinder, which is estimated based on the accelerator operation amount, on the assumption that the throttle valve opening amount is increased as the accelerator operation amount increases.

The control apparatus further includes a first index value determination device that determines a first index value that indicates the state of combustion of an air-fuel mixture in a cylinder of the engine; a secondary opening amount setting device that sets a secondary throttle valve opening amount, which is a final target value of an opening amount of a throttle valve, to make the determined first index value equal to a first target index value; and a throttle valve control device that controls the throttle valve so that the opening amount of the throttle valve is equal to the set secondary throttle valve opening amount.

The above-described first index value indicates the state (progression degree) of combustion of the air-fuel mixture, for example, a mass fraction burned (MFB) and a heat amount ratio, which will be described later. When the air-fuel ratio is made lean, the first index value is changed. Accordingly, the control apparatus in the aspect determines the first index value, and controls the throttle valve opening amount so that the determined first index value is equal to the first target index value. That is, the control apparatus in the aspect makes the air-fuel ratio lean by increasing the throttle valve opening amount so that the determined first index value is equal to the first target index value, without changing the fuel injection amount set based on the accelerator operation amount.

As a result, when the air-fuel ratio is changed to a leaner air-fuel ratio, the amount of the fuel contributing to the combustion is not decreased. This avoids the situation where a driver may feel discomfort due to a relatively large decrease in the torque generated by the engine. Further, when the intake air amount cannot be accurately estimated, for example, during transient operation of the engine, it is possible to make the air-fuel ratio lean while reducing the fluctuations in the torque generated by the engine, because the throttle valve opening amount is controlled so that the first index value is equal to the first target index value.

In the first aspect, the injection amount setting device may include: a primary opening amount setting device that sets a primary throttle valve opening amount so that the primary throttle valve opening amount is increased as the determined accelerator operation amount increases; an estimation device that estimates an air amount corresponding value, which is a value corresponding to an amount of air taken into the cylinder of the engine on an assumption that the opening amount of the throttle valve is equal to the primary throttle valve opening amount; and an injection amount calculation device that calculates the fuel injection amount so that an air-fuel ratio of the air-fuel mixture in the cylinder is equal to a primary target air-fuel ratio on an assumption that the air in an amount corresponding to the estimated air amount corresponding value is taken into the cylinder.

The air amount corresponding value estimated by the estimation device may be an intake air amount itself, or a value that is proportional to the intake air amount (for example, a value obtained by dividing an amount of air taken into each cylinder by the maximum volume of the cylinder). The estimation device may estimate the intake air amount as the intake air amount corresponding value, using known "air models" that represent behavior of air taken into the cylinder of the internal combustion engine according to laws of physics. Alternatively, the estimation device may estimate the intake air amount as the intake air amount corresponding value, using a lookup table (map), a function, or the like that defines in advance a relation between the throttle valve opening amount and the intake air amount.

For example, the primary target air-fuel ratio may be the stoichiometric air-fuel ratio, or a predetermined air-fuel ratio other than the stoichiometric air-fuel ratio. For example, the injection amount calculation device may calculate the fuel injection amount based on a value obtained by dividing the intake air amount corresponding to the intake air amount corresponding value (i.e., the intake air amount indicated by the intake air amount corresponding value) by the primary target air-fuel ratio. Alternatively, the injection amount calculation device may calculate the fuel injection amount using a lookup table, a function, or the like that defines in advance a relation between the air amount corresponding value and the fuel injection amount (i.e., a relation between the air amount corresponding value and the fuel injection amount at the primary target air-fuel ratio).

With the configuration, the fuel injection amount is calculated so that the air-fuel ratio of the air-fuel mixture in the cylinder is equal to the primary target air-fuel ratio, on the assumption that the actual throttle valve opening amount is controlled to "the primary throttle valve opening amount that is increased as the accelerator operation amount increases". As a result, as the required engine torque increases with an increase in the accelerator operation amount, a larger amount of the fuel is injected.

Further, in the first aspect, the secondary opening amount setting device may include: an air-fuel ratio corresponding value calculation device that calculates an air-fuel ratio corresponding value, which is a value corresponding to a secondary target air-fuel ratio used to make the determined first index value equal to the first target index value, based on the first index value and the first target index value; and a secondary opening amount calculation device that calculates the secondary throttle valve opening amount, based on a value corresponding to the calculated fuel injection amount, and the determined air-fuel ratio corresponding value.

The above-described "air-fuel ratio corresponding value" may be the target air-fuel ratio (secondary target air-fuel ratio) used to make the first index value equal to the first target index value. Alternatively, the "air-fuel ratio corresponding value" may be an air-fuel ratio correction value used to make the air-fuel ratio equal to the secondary target air-fuel ratio. The "value corresponding to the calculated fuel injection amount" may be, for example, the fuel injection amount calculated by the injection amount calculation device. Alternatively, for example, the "value corresponding to the calculated fuel injection amount" may be the intake air amount based on which the fuel injection amount is calculated by the injection amount calculation device (or the value corresponding to the intake air amount, which is proportional to the intake air amount, for example, a load factor, and the above-described air amount corresponding value). Then, "the secondary throttle valve opening amount used to make the first index value equal to the first target index value" is calculated based on the value corresponding to the calculated fuel injection amount, and the determined air-fuel ratio corresponding value.

With the configuration, it is possible to easily set the air-fuel ratio to an appropriate lean air-fuel ratio (the leanest possible air-fuel ratio at which the state of combustion is in a permissible range, that is, a lean air-fuel ratio used to make the first index value equal to the first target index value), by making the throttle valve opening amount equal to the secondary throttle valve opening amount calculated in the above-described manner, without changing the fuel injection amount.

The first index value may be the actual mass fraction burned (MFB) when the crank angle $\theta$ of the internal combustion engine is equal to the predetermined first crank angle ($\theta=\theta 1$). With the configuration, it is possible to reliably determine the index value that appropriately indicates the state of combustion. The first crank angle $\theta 1$ may be a crank angle in a medium stage to a late stage of the actual combustion. The first crank angle $\theta 1$ may be set so that when the air-fuel ratio is equal to the target lean air-fuel ratio, the mass fraction burned at the first crank angle $\theta 1$ is equal to a predetermined value, and when the air-fuel ratio is richer than the target lean air-fuel ratio, the mass fraction burned at the first crank angle $\theta 1$ is higher than a predetermined value. For example, the first crank angle $\theta 1$ may be 30 degrees CA after a compression top dead center (30 degrees CAATDC).

The mass fraction burned MFB is the index value that indicates the state of combustion in the engine. The mass fraction burned MFB is substantially equivalent to a heat amount ratio. The heat amount ratio is defined as "the ratio Qsum/Qtotal, that is, the ratio of an accumulated heat amount Qsum, which is an accumulated amount of heat that is generated by fuel combusted in a combustion chamber until a predetermined timing (a predetermined crank angle), and that is converted to work applied to a piston, to a total heat amount Qtotal, which is a total amount of heat that is generated by all the fuel combusted in the combustion chamber, and that is converted to work applied to the piston". The mass fraction burned MFB is defined as "the ratio of an accumulated amount of fuel that is combusted in a combustion chamber until a predetermined timing (predetermined crank angle), and that contributes to work applied to a piston, to a total amount of all the fuel that is combusted in the combustion chamber, and that contributes to work applied to the piston".

The mass fraction burned MFB is easily determined based on the pressure in a cylinder (hereinafter, may be referred to as "cylinder pressure") according to equation (1) described below. The mass fraction burned MFB is determined with respect to a crank angle $\theta$ that indicates a predetermined timing. The mass fraction burned MFB at the crank angle $\theta$ is represented by MFB$\theta$. Thus, the first index value is the mass fraction burned when the crank angle $\theta$ is set to the first crank angle $\theta 1$. A detailed method of determining the mass fraction burned MFB is described in, for example, Japanese Patent Application Publication No. 2006-144645 (JP-A-2006-144645), and Japanese Patent Application Publication No. 2007-32531 (JP-A-2007-32531).

$$MFB\theta = \frac{Pc(\theta) \cdot V(\theta)^K - Pc(\theta s) \cdot V(\theta s)^K}{Pc(\theta e) \cdot V(\theta e)^K - Pc(\theta s) \cdot V(\theta s)^K} \quad (1)$$

The above-described equation (1) is set based on knowledge that a pattern of change in an accumulated heat amount Q substantially matches a pattern of change in Pc($\theta$)×V ($\theta$)'. The accumulated heat amount Q is an accumulated amount of heat that is generated, and that contributes to work applied to the piston. Pc ($\theta$) is a cylinder pressure at the crank angle $\theta$, V (θ) is a volume of the combustion chamber 25 at the crank angle θ, and κ is a ratio of specific heat of mixed gas (for example, 1.32). The denominator of equation (1) is a value equivalent to 100% of MFB.

The crank angle θ in equation (1) is defined so that the crank angle θ is 0 at the compression top dead center; when the crank angle θ is advanced from the compression top dead center toward a point before the compression top dead center, the crank angle θ is a negative value, and the absolute value of the crank angle θ increases; and when the crank angle θ is retarded from the compression top dead center toward a point after the compression top dead center, the crank angle θ is a positive value, and the absolute value of the crank angle θ increases. In equation (1), a crank angle θs (θs<0) is a timing at which both of an intake valve and an exhaust valve are closed in a compression stroke before a target combustion stroke (expansion stroke), and which is sufficiently advanced relative to an ignition timing (for example, θs=−30 degrees, that is, 30 degrees CA BTDC). The crank angle θe (θe>0) is a predetermined timing that is retarded relative to the most retarded timing at which combustion in the target combustion stroke substantially ends, and that is advanced relative to an exhaust valve opening timing (for example, θe=60 degrees, that is, 60 degrees CA ATDC). $Pc(\theta e) \times Vc(\theta e)^\kappa$ in equation (1) may be replaced by the maximum value of $Pc(\theta) \times Vc(\theta)^\kappa$ in a range of the crank angle θs to θe.

Also, the first index value determination device may determine, as the first index value, the mass fraction burned MFBθ when the crank angle θ is equal to the first crank angle θ1(θ=θ1), using a combustion model called a Wiebe function, which is represented by equation (2) described below (for example, refer to Japanese Patent Application Publication No. 2006-9720 (JP-A-2006-9720)). In equation (2), the parameter c and the parameter d are predetermined constants. Also, the parameter αi in equation (2) may be varied in accordance with the ignition timing, and the parameter αb may be varied in accordance with the valve overlap period, in which both of the intake valve and the exhaust valve are open.

$$MFB\theta = 1 - \exp\left[-c \cdot \left(\frac{\theta + \alpha i}{\alpha b}\right)^d\right] \quad (2)$$

Thus, by employing, as the first index value, the actual mass fraction burned when the crank angle of the internal combustion engine is equal to a predetermined first crank angle, it is possible to easily control the air-fuel ratio to a desired lean air-fuel ratio (the leanest possible air-fuel ratio in a range in which combustion is stable, that is, a lean limit air-fuel ratio), without destabilizing the state of combustion in the engine.

The control apparatus for the internal combustion engine according to the invention may further include a second index value determination device that determines a second index value that indicates the state of combustion of the air-fuel mixture in the cylinder of the engine; and an ignition timing control device that controls an ignition timing so that the second index value is equal to a second target index value.

With the configuration, the ignition timing is controlled so that the second index value is equal to the second target index value. Because the ignition timing is controlled so that the second index value, which is different from the first index value, is equal to the second target index value, when there is individual variation among internal combustion engines, the ignition timing is appropriately controlled in accordance with each engine. As a result, combustion efficiency is improved, and torque output from the internal combustion engine is increased. That is, with the above-described configuration, when there is individual variation among engines, it is possible to make the air-fuel ratio of the air-fuel mixture lean while maintaining the stable combustion state, and to efficiently combust the air-fuel mixture.

By determining the second mass fraction burned MFBθ2 at the predetermined second crank angle (second crank angle θ2), and controlling an ignition timing SA so that the second mass fraction burned MFBθ2 is equal to a target value (for example, a predetermined value in a range of 50% to 60%), the combustion efficiency is improved, and the torque output from the internal combustion engine is increased. The second crank angle θ2 is generally 8 degrees CA after the compression top dead center (8 degrees CA ATDC). The above-described first crank angle θ1 is a predetermined crank angle in a middle stage to a late stage of combustion. For example, the first crank angle θ1 is 30 degrees CA after the compression top dead center (30 degrees CA ATDC).

Thus, the second index value determination device may determine the actual mass fraction burned when the crank angle of the internal combustion engine is equal to the second crank angle, which is advanced relative to the first crank angle, as the second index value.

With the configuration, it is possible to more easily determine the second index value. In this case as well, the mass fraction burned MFBθ (θ=θ2) may be easily determined using the above-described equation (1) or the above-described equation (2).

A second aspect of the invention relates to a control method for an internal combustion engine. The control method includes: determining an accelerator operation amount; setting a fuel injection amount based on the determined accelerator operation amount; injecting fuel in the set fuel injection amount; determining a first index value that indicates a state of combustion of an air-fuel mixture in a cylinder of the engine; setting a first target index value that is a target value of the first index value; setting a secondary throttle valve opening amount that makes the determined first index value equal to the first target index value, wherein the secondary throttle valve opening amount is a final target value of an opening amount of a throttle valve; and controlling the throttle valve so that the opening amount of the throttle valve is equal to the set secondary throttle valve opening amount.

According to the second aspect, the air-fuel ratio is made lean by increasing the opening amount of the throttle valve so that the determined first index value is equal to the first target index value, without changing the fuel injection amount set based on the accelerator operation amount. When the air-fuel ratio is changed to a leaner air-fuel ratio, the amount of the fuel contributing to the combustion is not decreased. This avoids the situation where a driver feels discomfort due to a relatively large decrease in the torque generated by the engine.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF EMBODIMENTS

Figure 1:
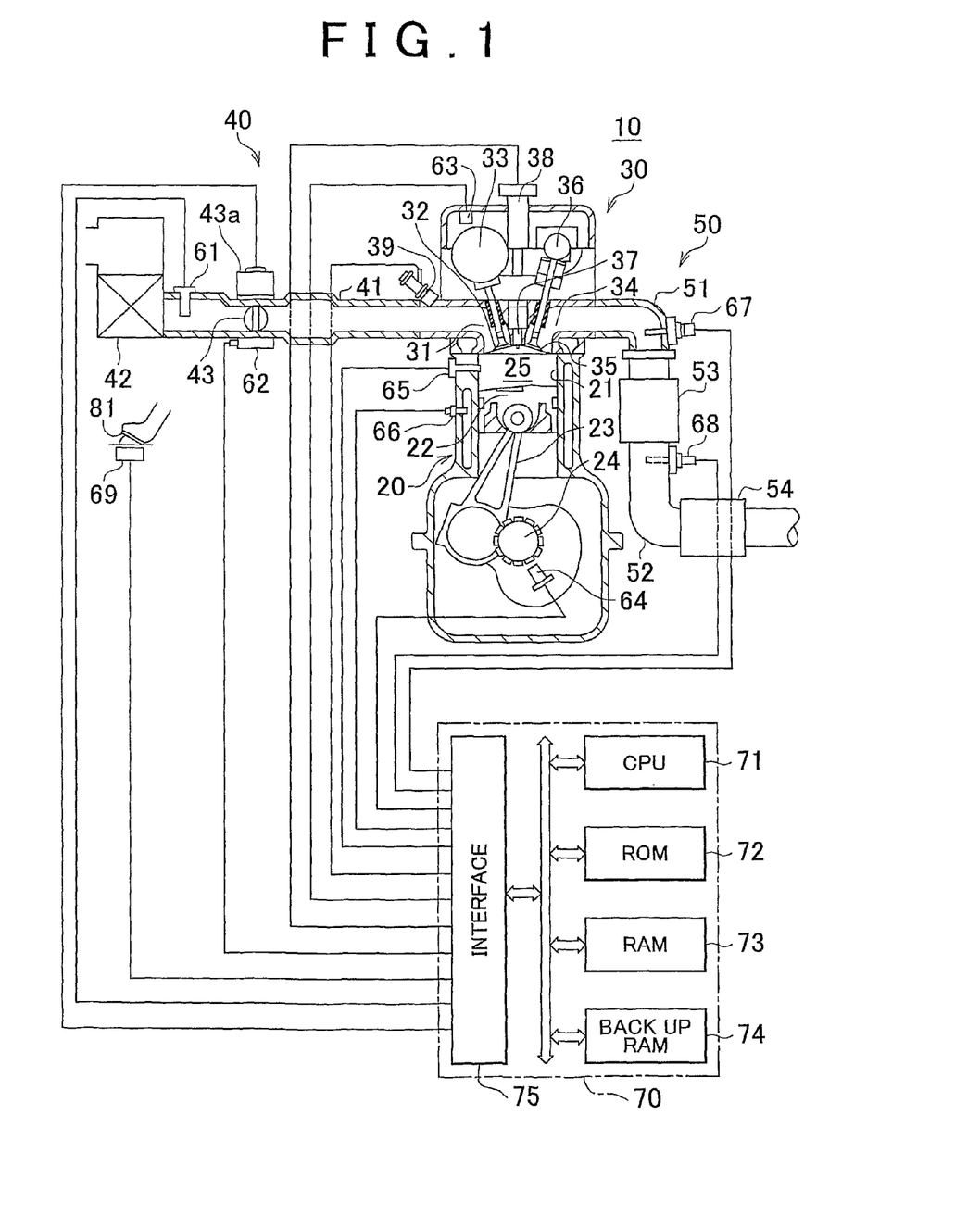
FIG. 1 is a diagram schematically showing an internal combustion engine equipped with a control apparatus according to an embodiment of the invention.

Hereinafter, various embodiments of a control apparatus for an internal combustion engine according to the invention will be described with reference to the drawings. FIG. 1 is a diagram schematically showing a configuration of a system in which the control apparatus is applied to a spark-ignition multi-cylinder (four-cylinder) four-cycle internal combustion engine 10 with a reciprocating piston. Although FIG. 1 shows the sectional view of only one cylinder, the other cylinders have the same configuration.

The internal combustion engine 10 includes a cylinder block portion 20 that includes a cylinder block, a cylinder block lower case, and an oil pan; a cylinder head portion 30 fixed on the cylinder block portion 20; an intake system 40 for supplying a mixture of air and gasoline to the cylinder block portion 20; and an exhaust system 50 for discharging exhaust gas from the cylinder block portion 20 to the outside.

The cylinder block portion 20 includes a cylinder 21, a piston 22, a connecting rod 23, and a crankshaft 24. The piston 22 reciprocates in the cylinder 21. The reciprocating movement of the piston 22 is transmitted to the crankshaft 24 via the connecting rod 23. Thus, the crankshaft 24 is rotated. The cylinder 21, a head of the piston 22, and the cylinder head portion 30 form a combustion chamber 25.

The cylinder head portion 30 includes an intake port 31 connected to the combustion chamber 25, an intake valve 32 that opens/closes the intake port 31, an intake valve control device 33 that opens/closes the intake valve 32, an exhaust port 34 connected to the combustion chamber 25, an exhaust valve 35 that opens/closes the exhaust port 34, an exhaust camshaft 36 that drives the exhaust valve 35, an ignition plug 37, an igniter 38 that includes an ignition coil that generates a high voltage to be provided to the ignition plug 37, and an injector (fuel injection device) 39 that injects the fuel into the intake port 31.

The intake valve control device 33 has a known configuration that adjusts and controls the relative rotational angle (phase angle) of an intake camshaft and an intake cam (not shown) using a hydraulic pressure. The intake valve control device 33 changes an opening timing (intake valve opening timing) VT of the intake valve 32. In the embodiment, an opening period of the intake valve (valve duration) is constant. Accordingly, if the intake valve opening timing is advanced or retarded by a predetermined angle, an intake valve closing timing is advanced or retarded by the predetermined angle.

The intake system 40 includes an intake pipe 41, an air filter 42, a throttle valve 43, and a throttle valve actuator 43a. The intake pipe 41 includes an intake manifold that is connected to the intake port 31, and that forms an intake passage together with the intake port 31. The air filter 42 is provided at an end portion of the intake pipe 41. The throttle valve 43 is provided in the intake pipe 41 to change an opening sectional area of the intake passage. The throttle valve actuator 43a includes a DC motor, and constitutes a throttle valve drive device (throttle valve control device). When the throttle valve actuator 43a receives a drive signal indicating a secondary throttle valve opening amount TAtgt, the throttle valve actuator 43a drives the throttle valve 43 so that the actual opening amount TA of the throttle valve 43 is equal to the second throttle valve opening amount TAtgt.

The exhaust system 50 includes an exhaust manifold 51 connected to the exhaust port 34, an exhaust pipe 52 connected to the exhaust manifold 51, an upstream three-way catalyst (first catalyst) 53, and a downstream three-way catalyst (second catalyst) 54. The upstream three-way catalyst 53 is provided in the exhaust pipe 52. The downstream three-way catalyst 54 is provided in the exhaust pipe 52 at a position downstream of the upstream three-way catalyst 53. The exhaust port 34, the exhaust manifold 51, and the exhaust pipe 52 constitute an exhaust passage.

The system includes a hot-wire airflow meter 61; a throttle position sensor 62; a cam position sensor 63; a crank position sensor 64; a cylinder pressure sensor 65 provided in each cylinder; a coolant temperature sensor 66; an upstream air-fuel ratio sensor 67 provided in the exhaust passage at a position upstream of the first catalyst 53; a downstream air-fuel ratio sensor 68 provided in the exhaust passage at a position downstream of the first catalyst 53 and upstream of the second catalyst 54; and an accelerator operation amount sensor 69.

The hot-wire airflow meter 61 detects the mass flow rate of intake air flowing in the intake pipe 41 per unit time, and outputs a signal indicating the mass flow rate Ga. The throttle position sensor 62 detects an opening amount of the throttle valve 43, and outputs a signal indicating the throttle valve opening amount TA. The cam position sensor 63 outputs a pulse when the intake camshaft is rotated from a predetermined angle by 90 degrees, outputs a pulse when the intake camshaft is further rotated by 90 degrees, and outputs a pulse when the intake camshaft is further rotated by 180 degrees. The signal output by the cam position sensor 63 may be referred to as "G2 signal". The crank position sensor 64 outputs a pulse each time the crankshaft 24 is rotated by 10 degrees. The pulse output from the crank position sensor 64 is converted to a signal indicating an engine speed NE. Further, based on the signals from the cam position sensor 63 and the crank position sensor 64, an absolute crank angle of the engine 10, and a crank angle θ relative to a compression top dead center in each cylinder are determined. The cylinder pressure sensor 65 detects the pressure in the combustion chamber 25, in which the cylinder pressure sensor 65 is fitted, and outputs a signal indicating the detected cylinder pressure Pc in the combustion chamber 25.

The upstream air-fuel ratio sensor 67 detects an air-fuel ratio upstream of the catalyst 53, and outputs a signal indicating the air-fuel ratio upstream of the catalyst 53. The downstream air-fuel ratio sensor 68 detects an air-fuel ratio downstream of the catalyst 53, and outputs a signal indicating the air-fuel ratio downstream of the catalyst 53. The accelerator operation amount sensor 69 detects the operation amount of an accelerator pedal 81 operated by a driver, and outputs a signal indicating the detected operation amount PA of the accelerator pedal 81.

An electric control unit 70 is a microcomputer that includes a CPU 71, a ROM 72, a RAM 73, a backup RAM 74, and an interface 75. Routines (programs) executed by the CPU 71, tables (look-up tables and maps), constants, and the like are stored in the ROM 72 in advance. The CPU 71 temporarily stores data in the RAM 73 as necessary. When electric power is supplied to the backup RAM 74, data is stored in the backup RAM 74, and when the supply of electric power is interrupted, the data is retained in the backup RAM 74. The interface 75 includes an AD converter. The interface 75 is connected to the sensors 61 to 69, and supplies signals from the sensors 61 to 69 to the CPU 71. The interface 75 transmits drive signals to the intake valve control device 33, the injector 39, and the throttle valve actuator 43a, and transmits an ignition signal to the igniter 38 according to an instruction from the CPU 71.

[Summary 1 of Control: Control of the Fuel Injection Amount and the Throttle Valve Opening Amount]

Next, the control of the fuel injection amount and the throttle valve opening amount executed by the control apparatus with the above-described configuration will be described. The control apparatus sets a fuel injection amount based on the accelerator operation amount, and controls the throttle valve opening amount so that an air-fuel ratio of the air-fuel mixture formed by the fuel in the fuel injection amount is a lean air-fuel ratio (lean limit air-fuel ratio). The control apparatus makes the throttle valve opening amount equal to a secondary throttle valve opening amount. The secondary throttle valve opening amount is set so that a first mass fraction burned MFBθ1, which is a first index value, is equal to a first target mass fraction burned MFBθ1, that is a first target index value.

Figure 2:
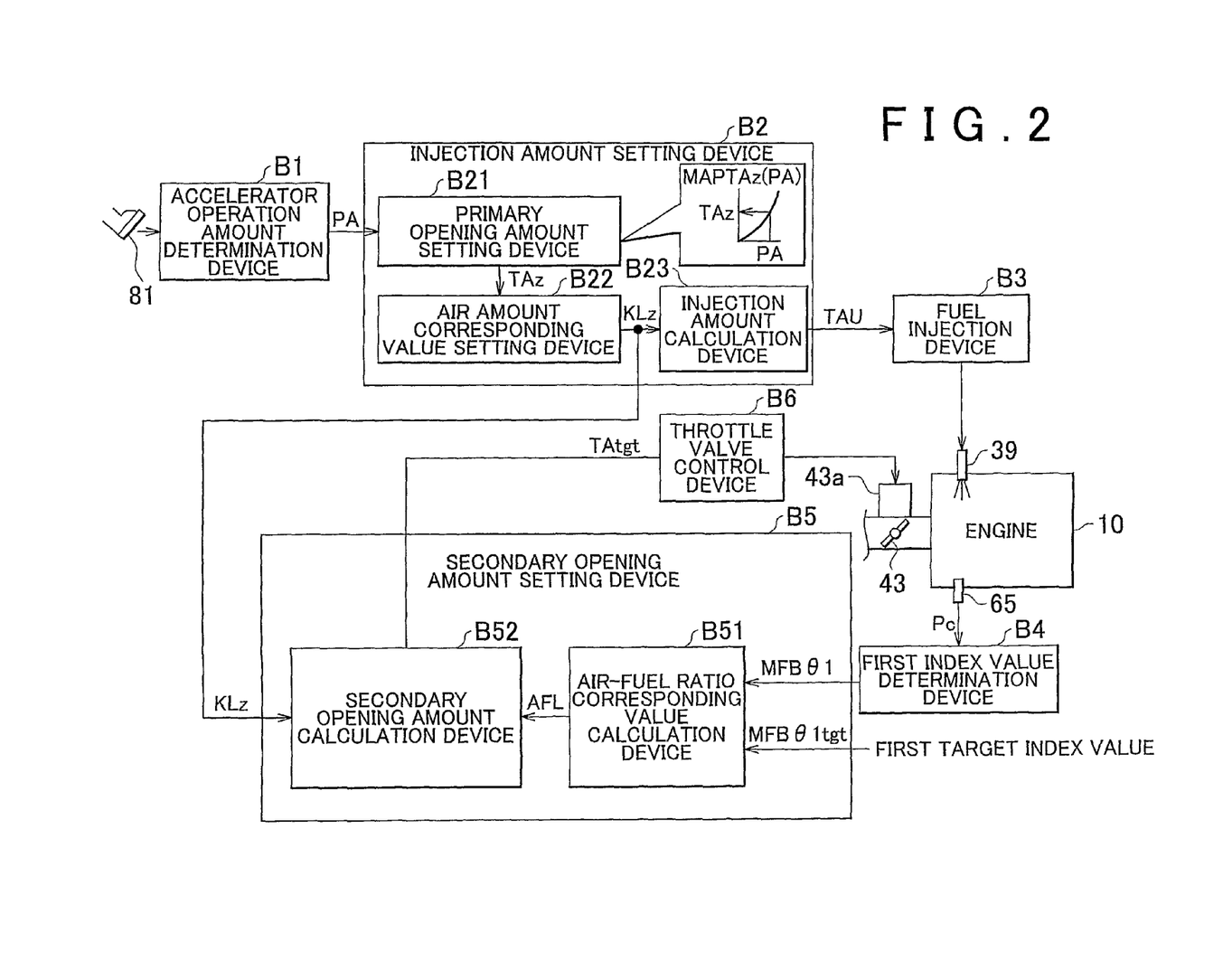
FIG. 2 is a functional block diagram showing the control apparatus according to the embodiment of the invention.

More specifically, as conceptually shown in FIG. 2 that is a functional block diagram, the control apparatus includes an accelerator operation amount determination device B1, an injection amount setting device B2, and a fuel injection device B3. In the specification, the function of each block shown in the functional block diagram is implemented when the CPU 71 executes a predetermined program (not shown).

The accelerator operation amount determination device B1 determines the operation amount PA of the accelerator pedal 81, based on the signal from the accelerator operation amount sensor 69.

The injection amount setting device B2 includes a primary opening amount setting device B21, an air amount corresponding value setting device B22, and an injection amount calculation device B23. The injection amount setting device B2 sets a fuel injection amount TAU based on the accelerator-pedal operation amount PA, using the primary opening amount setting device B21, the air amount corresponding value setting device B22, and the injection amount calculation device B23.

Based on the determined accelerator-pedal operation amount PA and a throttle valve opening amount table (refer to MAPTAz (PA) in FIG. 2), the primary opening amount setting device B21 sets a primary throttle valve opening amount TAz so that the primary throttle valve opening amount TAz is increased as the accelerator-pedal operation amount PA increases.

The air amount corresponding value setting device B22 estimates an air amount corresponding value KLz based on at least the determined primary throttle valve opening amount TAz. The air amount corresponding value KLz is a value corresponding to a primary intake air amount Mcz that is a reference amount of air taken into the cylinder (combustion chamber 25) of the engine 10 on the assumption that the actual throttle valve opening amount is equal to the primary throttle valve opening amount TAz that is set. In the embodiment, the air amount corresponding value KLz is a value obtained by dividing the primary intake air amount Mcz, which is the reference intake air amount on the assumption that the actual throttle valve opening amount is equal to the set primary throttle valve opening amount TAz, by the maximum volume k of the cylinder (that is, KLz=Mcz/k). Hereinafter, the value KLz may be referred to as "tentative load factor KLz".

The injection amount calculation device B23 calculates the fuel injection amount TAU so that the air-fuel ratio of the air-fuel mixture formed in the cylinder is equal to a primary target air-fuel ratio ABYFz, on the assumption that the air in the amount corresponding to the air amount corresponding value KLz (that is, the primary intake air amount Mcz) is taken into the cylinder. In this embodiment, the primary target air-fuel ratio ABYFz is the stoichiometric air-fuel ratio stoich. Accordingly, the injection amount calculation device B23 calculates the fuel injection amount TAU by dividing the air amount corresponding to the air amount corresponding value KLz (that is, the primary intake air amount Mcz=k× KLz) by the stoichiometric air-fuel ratio stoich that is the primary target air-fuel ratio ABYFz (that is, TAU=k×KLz/stoich).

The fuel injection device B3 includes the injector 39. The fuel injection device B3 causes the injector 39 to inject the fuel in the set fuel injection amount TAU for the cylinder during the intake stroke of the piston.

Thus, the control apparatus sets the fuel injection amount TAU based on the accelerator-pedal operation amount PA, and supplies the fuel in the set fuel injection amount TAU to the engine 10.

The control apparatus further includes a first index value determination device B4, a secondary opening amount setting device B5, and a throttle valve control device B6.

Figure 3:
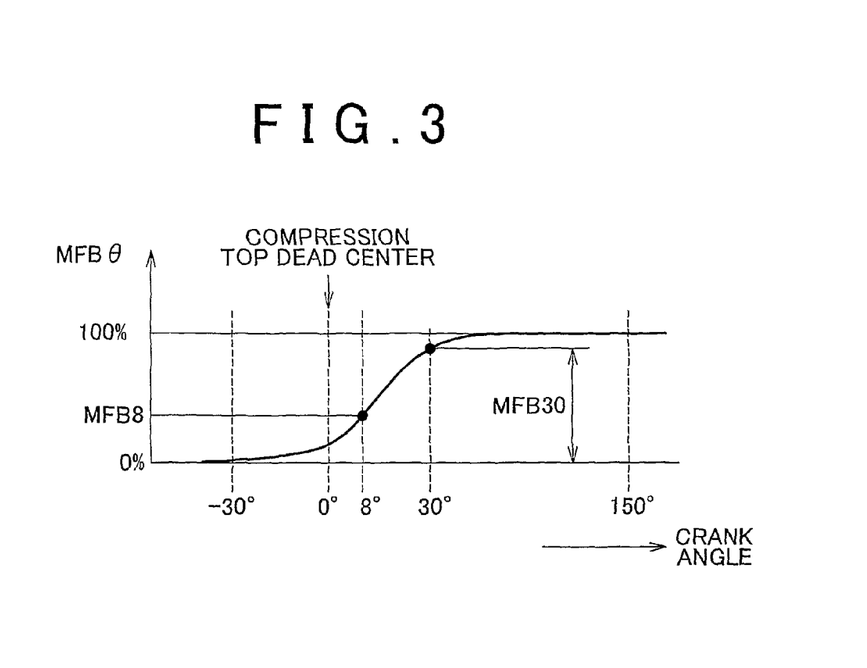
FIG. 3 is a time chart showing how a mass fraction burned changes with respect to a crank angle.

The first index value determination device B4 determines the first mass fraction burned MFBθ1, which is the first index value, based on at least the cylinder pressure Pc obtained from the cylinder pressure sensor 65. The above-described mass fraction burned MFBθ changes in accordance with changes in the crank angle θ in the cylinder during the combustion stroke of the piston, as shown in FIG. 3. As shown in FIG. 3, the mass fraction burned MFBθ is "the index value that indicates the state (progression degree) of combustion of the air-fuel mixture formed in the cylinder (combustion chamber 25) of the engine 10". Thus, the first mass fraction burned MFBθ1 is "the first index value that indicates the state (progression degree) of combustion of the air-fuel mixture formed in the cylinder when the crank angle θ in the cylinder in which the piston is in the combustion stroke is equal to a first crank angle θ1".

More specifically, the first index value determination device B4 determines the first mass fraction burned MFBθ1 based on the cylinder pressure Pc obtained from the cylinder pressure sensor 65, the crank angle θ determined based on the signals from the cam position sensor 63 and the crank position sensor 64, using the above-described equation (1). The first crank angle θ1 is a predetermined crank angle in a medium stage to a late stage of the combustion. In the embodiment, the first crank angle θ1 is 30 degrees crank angle (CA) after a compression top dead center (ATDC) (θ1=30 degrees CA ATDC). The first mass fraction burned MFBθ1 at 30 degrees CA ATDC may be referred to as "30-degree mass fraction burned MFB30 (or simply referred to as "mass fraction burned MFB30")".

Figure 4:
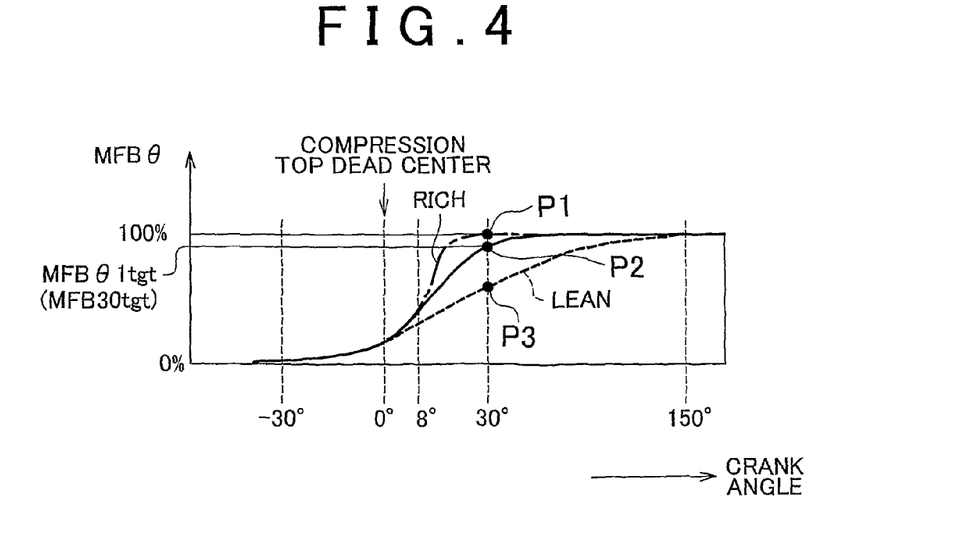
FIG. 4 is a time chart showing how the mass fraction burned changes with respect to the crank angle, when an air-fuel ratio is changed to each value.

FIG. 4 is a graph showing how the mass fraction burned MFBθ changes when the air-fuel ratio is set to each of various values. In FIG. 4, the solid line indicates the mass fraction burned MFBθ when the air-fuel ratio is set to a value which is leaner (higher) than the stoichiometric air-fuel ratio, and above which the combustion is unstable (this value may be referred to as "lean limit air-fuel ratio"). The chain line indicates the mass fraction burned MFBθ when the air-fuel ratio is set to a value richer (lower) than the lean limit air-fuel ratio. The dashed line indicates the mass fraction burned MFBθ when the air-fuel ratio is set to a value leaner (higher) than the lean limit air-fuel ratio.

As shown by the point P1, the point P2, and the point P3 in FIG. 4, the first mass fraction burned MFBθ1 (=the mass fraction burned MFB30) decreases as the air-fuel ratio is leaner (i.e., as the air-fuel ratio increases). It has been empirically determined that when the first mass fraction burned MFBθ1 is equal to or below the value indicated by the point P2, the air-fuel ratio is excessively high, and therefore, the combustion is unstable. Thus, the control apparatus sets the first target mass fraction burned MFBθ1tgt, which is the target value of the first mass fraction burned MFBθ1, to the value of the mass fraction burned MFBθ indicated by the point P2. In the embodiment, the first target mass fraction burned MFBθ1 is set to 90%. Then, the control apparatus determines the actual first mass fraction burned MFBθ1, and executes an air-fuel ratio feedback control so that the determined first mass fraction burned MFBθ1 is equal to the first target mass fraction burned MFBθ1tgt corresponding to the lean limit air-fuel ratio. The first target mass fraction burned MFBθ1tgt is set to various values (for example, values in a range of 85 to 97%), in accordance with each engine 10.

More specifically, the secondary opening amount setting device B5 adjusts the air-fuel ratio so that the first mass fraction burned MFBθ1 (=mass fraction burned MFB30), which is the determined first index value, is equal to the first target mass fraction burned MFBθ1tgt (=mass fraction burned MFB30tgt) that is the first target index value. At this time, the secondary opening amount setting device B5 does not change the fuel injection amount TAU, and changes the throttle valve opening amount. That is, based on the first mass fraction burned MFBθ1 and the first target mass fraction burned MFBθ1tgt (actually, based on a difference ΔMFB30= (MFB30−MFB30tgt)), the secondary opening amount setting device B5 sets a final target value of the throttle valve opening amount (the secondary throttle valve opening amount TAtgt) for achieving an air-fuel ratio required to make the difference (ΔMFB30) "zero".

More specifically, the secondary opening amount setting device B5 includes an air-fuel ratio corresponding value calculation device B51 and a secondary opening amount calculation device B52.

Based on the determined first mass fraction burned MFBθ1 and the first target mass fraction burned MFBθ1tgt, the air-fuel ratio corresponding value calculation device B51 calculates a value AFL (hereinafter, this value may be referred to as "air-fuel ratio corresponding value AFL") corresponding to a secondary target air-fuel ratio used to make the first mass fraction burned MFBθ1 (mass fraction burned MFB30), which is the determined first index value, equal to the first target mass fraction burned MFBθ1tgt (target mass fraction burned MFB30tgt) that is the first target index value. In the embodiment, the air-fuel ratio corresponding value is a target air-fuel ratio AFL of the air-fuel mixture supplied to the engine 10. For example, the air-fuel ratio corresponding value may be "a ratio with respect to the stoichiometric air-fuel ratio" for indicating the target air-fuel ratio.

For example, if the first mass fraction burned MFBθ1 (mass fraction burned MFB30) is lower than the first target mass fraction burned MFBθ1tgt (target mass fraction burned MFB30tgt), the air-fuel ratio corresponding value calculation device B51 corrects (decreases) the air-fuel ratio corresponding value AFL so that the air-fuel ratio is richer. If the first mass fraction burned MFBθ1 is higher than the first target mass fraction burned MFBθ1tgt, the air-fuel ratio corresponding value calculation device B51 corrects (increases) the air-fuel ratio corresponding value AFL so that the air-fuel ratio is leaner.

Based on "the tentative load factor KLz" corresponding to the fuel injection amount TAU calculated by the injection amount calculation device B23, and "the target air-fuel ratio AFL" that is the determined air-fuel ratio corresponding value, the secondary opening amount calculation device B52 calculates the secondary throttle valve opening amount TAtgt required to achieve the target air-fuel ratio AFL with respect to the fuel injection amount TAU.

The throttle valve control device B6 includes the throttle valve actuator 43a. The throttle valve control device B6 controls the throttle valve 43 so that the actual opening amount of the throttle valve 43 is equal to the determined secondary throttle valve opening amount TAtgt, using the throttle valve actuator 43a.

Because the control apparatus controls the fuel injection amount and the throttle valve opening amount in the above-described manner, when the air-fuel ratio is changed to a leaner air-fuel ratio, the amount of the fuel contributing to the combustion is not decreased. This avoids the situation where the driver feels discomfort due to a relatively large decrease in the torque generated by the engine. Further, when it is not possible to accurately estimate the amount of air taken into the cylinder (hereinafter, may be referred to as "cylinder intake air amount"), for example, during transient operation of the engine, it is possible to make the air-fuel ratio lean while reducing the fluctuations in the torque generated by the engine, because the throttle valve opening amount is controlled so that the first index value (MFBθ1) is equal to the first target index value (MFBθ1tgt). In the above-described control, the control that causes the engine to output the torque according to the accelerator-pedal operation amount PA is given priority over the control of the air fuel ratio. Therefore, the above-described control may be referred to as "torque demand control".

[Summary 2 of Control: Ignition Timing Control]

Figure 5:
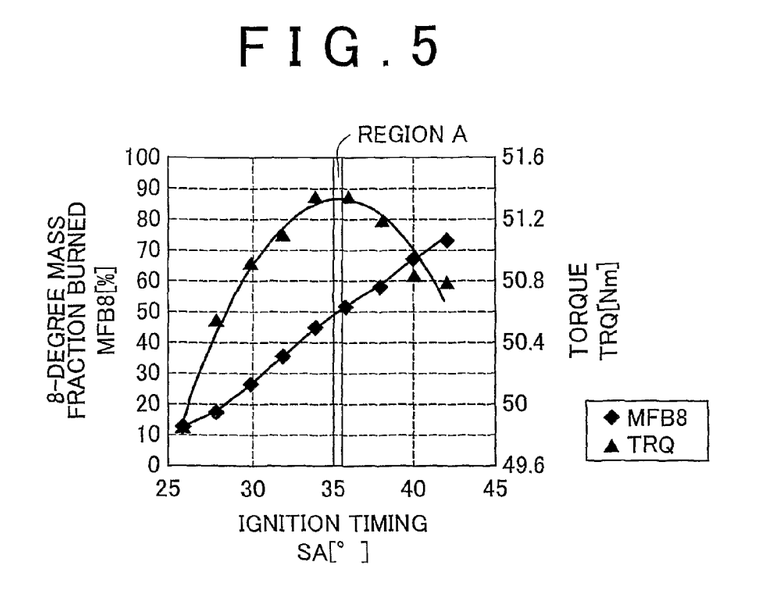
FIG. 5 is a graph showing a relation among an ignition timing, an actual mass fraction burned when the crank angle is equal to a predetermined second crank angle, and torque generated by the engine.

Next, an ignition timing control executed by the control apparatus will be described. FIG. 5 is a graph showing a relation among an ignition timing SA, an actual mass fraction burned MFBθ2 when the crank angle θ of the engine 10 is equal to a predetermined second crank angle (θ=θ2), and torque TRQ generated by the engine 10. The mass fraction burned MFBθ2 (second mass fraction burned MFBθ2) is "the second index value that indicates the state (progression degree) of combustion of the air-fuel mixture formed in the cylinder (combustion chamber 25) in the engine 10". The second crank angle θ2 is advanced relative to the first crank angle θ1 (that is, the second crank angle θ2 is a crank angle in the initial stage of the combustion). In the embodiment, the second crank angle θ2 is 8 degrees CA after the compression top dead center (8 degrees CA ATDC). The mass fraction burned MFBθ2 at 8 degrees CA ATDC may be referred to as "8-degree mass fraction burned MFB8 (or simply referred to as "mass fraction burned MFB8")". As shown in FIG. 5, the 8-degree mass fraction burned MFB8, at which the generated torque TRQ is the maximum value, is approximately 50% (refer to a region A in FIG. 5). In other words, by controlling the ignition timing so that the mass fraction burned MFB8 is equal to 50%, it is possible to maximize the torque generated by the engine 10.

Figure 6:
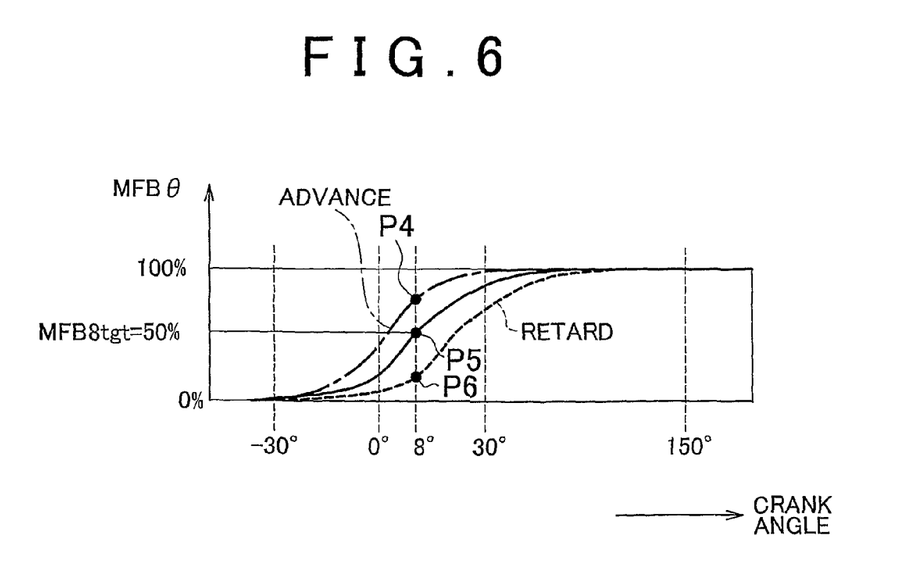
FIG. 6 is a time chart showing how the mass fraction burned changes with respect to the crank angle, when an ignition timing is changed to each timing.

FIG. 6 is a graph showing how the mass fraction burned MFBθ changes when the fuel injection amount and the cylinder intake air amount are constant (that is, the air-fuel ratio is constant), and the ignition timing SA is changed. In FIG. 6, the solid line indicates the mass fraction burned MFBθ when the ignition timing is set to a predetermined ignition timing. The chain line indicates the mass fraction burned MFBθ when the ignition timing is set to an ignition timing that is advanced relative to the predetermined ignition timing. The dashed line indicates the mass fraction burned MFBθ when the ignition timing is set to an ignition timing that is retarded relative to the predetermined ignition timing. As shown by the point P4, the point P5, and the point P6 in FIG. 6, as the ignition timing SA is retarded, the second mass fraction burned MFBθ2 (=mass fraction burned MFB8) is decreased. As the ignition timing SA is advanced, the second mass fraction burned MFBθ2 (=mass fraction burned MFB8) is increased.

Accordingly, the control apparatus executes a feedback control of the ignition timing SA so that "the mass fraction burned MFB8", which is the second mass fraction burned MFBθ2, that is, the second index value, is equal to "the second target mass fraction burned MFB8tgt (for example, a value close to 50%)" which is the second target index value at which the maximum torque is generated.

Figure 7:
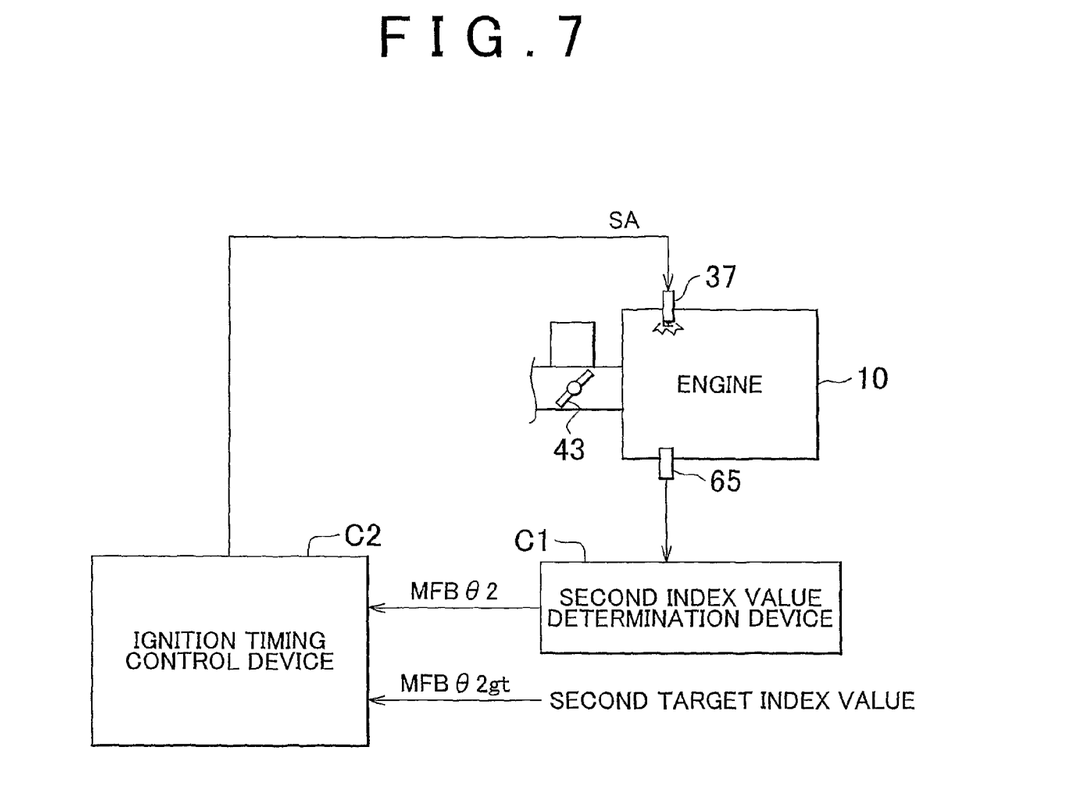
FIG. 7 is a functional block diagram showing the control apparatus according to the embodiment of the invention.

More specifically, as conceptually shown in FIG. 7 that is a functional block diagram, the control apparatus includes a second index value determination device C1 and an ignition timing control device C2.

The second index value determination device C1 determines the second mass fraction burned MFBθ2 (second mass fraction burned MFB8), which is the second index value, based on at least the cylinder pressure Pc obtained from the cylinder pressure sensor 65.

More specifically, the second index value determination device C1 determines the actual "second mass fraction burned MFBθ2" when the crank angle θ of the engine 10 is equal to the predetermined second crank angle (θ=θ2=8 degrees), based on the cylinder pressure Pc obtained from the cylinder pressure sensor 65, and the crank angle θ determined based on the signals from the cam position sensor 63 and the crank position sensor 64, using the above-described equation (1).

The ignition timing control device C2 executes the feedback control of the ignition timing SA so that the determined second index value (the mass fraction burned MFB8) is equal to the second target index value (the target mass fraction burned MFB8tgt; 50% in the embodiment). That is, if the mass fraction burned MFB8, which is obtained as a result of performing ignition at the immediately preceding ignition timing, is lower than the target mass fraction burned MFB8tgt, the ignition timing control device C2 advances the current ignition timing SA relative to the immediately preceding ignition timing by a predetermined advance amount. If the mass fraction burned MFB8, which is obtained as a result of performing ignition at the immediately preceding ignition timing, is higher than the target mass fraction burned MFB8tgt, the ignition timing control device C2 retards the current ignition timing SA relative to the immediately preceding ignition timing by a predetermined retard amount.

As a result, when there is manufacturing variation among the engines 10, the control apparatus appropriately controls the ignition timing in accordance with each engine 10. Accordingly, combustion efficiency is improved, and the torque output from the engine 10 is increased. That is, with the control apparatus, when there is individual variation among the engines 10, it is possible to control the air-fuel ratio of the air-fuel mixture to the lean limit air-fuel ratio while maintaining the stable combustion state, and to efficiently combust the air-fuel mixture.

[Specific Control 1: Control of the Fuel Injection Amount and the Throttle Valve Opening Amount]

Figure 8:
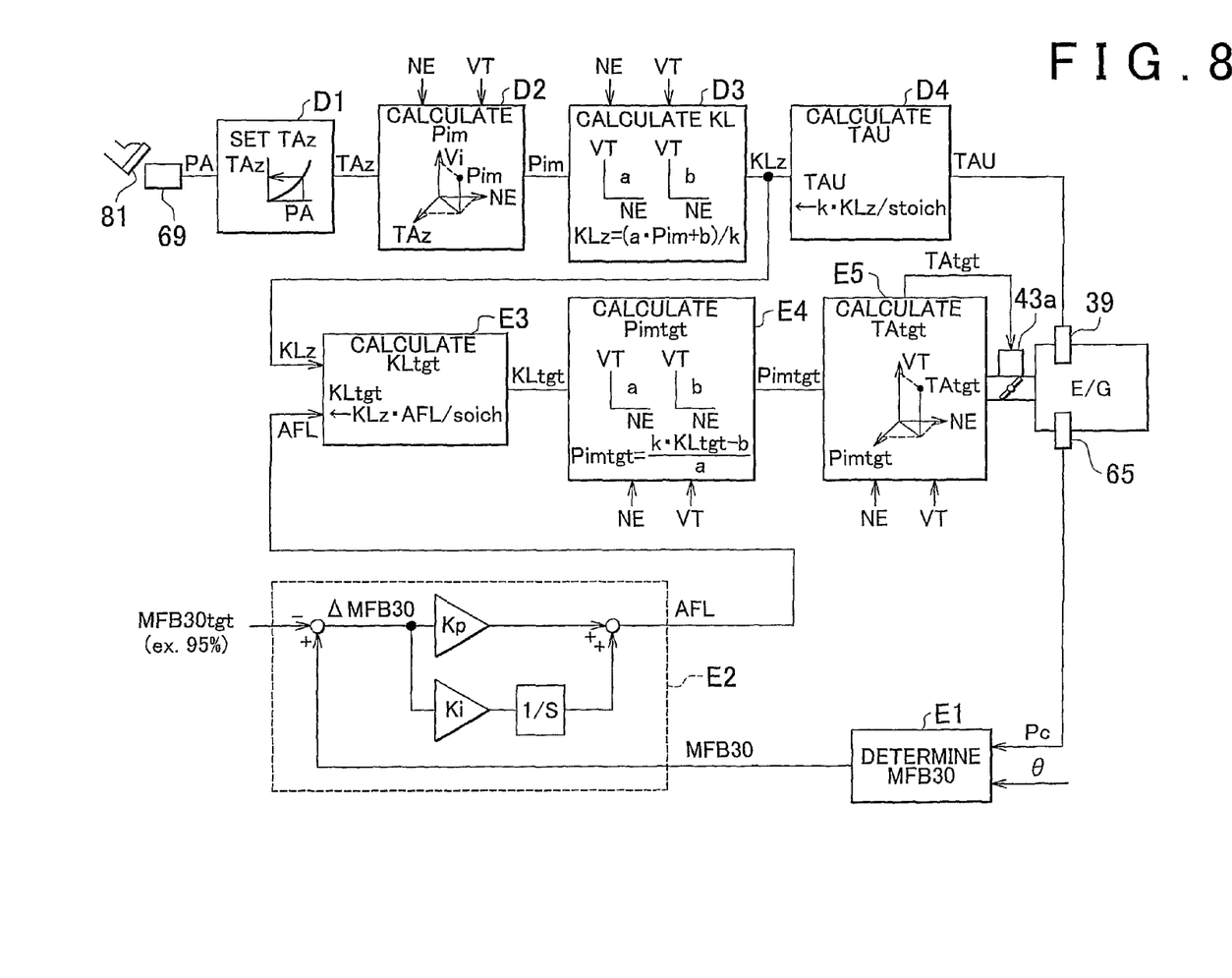
FIG. 8 is a detailed functional block diagram showing the control apparatus according to the embodiment of the invention.

Next, an actual control of the fuel injection amount and the throttle valve opening amount, which is executed by the control apparatus, will be described in detail. FIG. 8 is a functional block diagram of the control apparatus. Hereinafter, the functions will be sequentially described.

The control apparatus includes a primary opening amount setting portion D1, a pressure calculation portion D2 that calculates a pressure in the intake pipe, a load factor calculation portion D3, and an injection amount calculation portion D4 that calculates the fuel injection amount.

The primary opening amount setting portion D1 obtains the accelerator-pedal operation amount PA from the accelerator operation amount sensor 69, and sets the primary throttle valve opening amount TAz, based on the obtained accelerator-pedal operation amount PA, and the throttle-valve opening amount table described in the block D1 (refer to the table MAPTAz (PA) in FIG. 2). According to the throttle valve opening amount table MAPTAz (PA), the primary throttle valve opening amount TAz is set to increase as the accelerator-pedal operation amount PA increases.

The primary throttle valve opening amount TAz, the engine speed NE, and the intake valve opening timing VT are input to the pressure calculation portion D2. The engine speed NE is separately determined based on the pulse output from the crank position sensor 64. Further, the pressure calculation portion D2 includes an intake pipe pressure table that defines a relation between the primary throttle valve opening amount TAz, the engine speed NE, and the intake valve opening timing VT, and a pressure (intake pipe pressure) Pim in the intake pipe at a position downstream of the throttle valve 43. The intake pipe pressure table is empirically defined in advance. Then, the pressure calculation portion D2 calculates the intake pipe pressure Pim, based on the input primary throttle valve opening amount TAz, the input engine speed NE, and the input intake valve opening timing VT, using the intake pipe pressure table.

The intake pipe pressure Pim calculated by the pressure calculation portion D2, the engine speed NE, and the intake valve opening timing VT are input to the load factor calculation portion D3. The load factor calculation portion D3 includes a first table that defines "the relation between the engine speed NE and the intake valve opening timing VT, and a constant value a". The load factor calculation portion D3 further includes a second table that defines "the relation between the engine speed NE and the intake valve opening timing VT, and a constant value b".

The load factor calculation portion D3 sets the constant value a, based on the input engine speed NE and the input intake valve opening timing VT, using the first table. Similarly, the load factor calculation portion D3 sets the constant value b, based on the input engine speed NE and the input intake valve opening timing VT, using the second table. Finally, the load factor calculation portion D3 calculates the tentative load factor (a tentative load, or a tentative air filling ratio) KLz, by substituting the set constant value a, the set constant value b, and the input intake pipe pressure Pim into equation (3) described below. Because the tentative load factor KLz represents the primary intake air amount Mcz, the tentative load factor KLz may be referred to as "air amount corresponding value".

$$KLz=(a \times Pim-b)/k \qquad (3)$$

Equation (3) is an empirical equation (an equation that is empirically set), based on the idea "that the pressure in the cylinder in the intake stroke may be regarded as being equal to the pressure upstream of the intake valve 32, that is, the intake pipe pressure Pim, and therefore, a cylinder intake air amount Mc may be regarded as being proportional to the intake pipe pressure Pim when the intake valve is closed". In equation (3), the value b is a positive value that changes in accordance with "the amount of burned gas remaining in the cylinder". The value k is a predetermined constant value (for example, a value representing the maximum volume of each cylinder). Equation (3) is set on the assumption that an atmospheric temperature (intake air temperature) is equal to the temperature of the air in the intake pipe, for the sake of simplicity.

The pressure calculation portion D2 and the load factor calculation portion D3 may calculate the intake pipe pressure Pim and the load factor KLz, respectively, using known air models (a throttle valve model, an intake pipe model, and the like) that describe the behavior of air according to laws of physics. Such air models are described, for example, Japanese Patent No. 3901068, Japanese Patent Application Publication No. 2001-41095 (JP-A-2001-41095), Japanese Patent Application Publication No. 2003-184613 (JP-A-2003-184613), Japanese Patent Application Publication No. 2007-016660 (JP-A-2007-016660), and Japanese Patent Application Publication No. 2004-176638 (JP-A-2004-176638).

The injection amount calculation portion D4 calculates the fuel injection amount TAU by substituting the tentative load factor KLz calculated by the load factor calculation portion D3, and the primary target air-fuel ratio ABYFz (the primary target air-fuel ratio ABYFz=the stoichiometric air-fuel ratio stoich, in the embodiment) into equation (4) described below.

$$TAU=k \times KLz/\text{stoichi} \qquad (4)$$

The fuel injection amount TAU determined by equation (4) is the fuel amount that makes the air-fuel ratio of the air-fuel mixture formed in the cylinder equal to the primary target air-fuel ratio ABYFz, on the assumption that the air in the amount (that is, the primary intake air amount Mcz) corresponding to the load factor (the air amount corresponding value) KLz is taken into the cylinder.

Then, the fuel in the fuel injection amount TAU is injected from the injector 39, which functions as the fuel injection device, for the cylinder during the intake stroke.

The control apparatus further includes a determination portion E1 that determines the 30-degree mass fraction burned MFB30, a feedback portion E2, a target load factor calculation portion E3, a target pressure calculation portion E4 that calculates a target intake pipe pressure, and a secondary opening amount calculation portion E5.

The determination portion E1 determines the 30-degree mass fraction burned MFB30 that is the first index value, according to equation (5) described below, which is set based on the above-described equation (1). At this time, the determination portion E1 uses, as Pc (30°) in equation (5), the cylinder pressure Pc obtained from the cylinder pressure sensor 65 for "a given cylinder" when "the crank angle θ in the given cylinder", which is separately calculated based on the signals from the cam position sensor 63 and the crank position sensor 64, is 30 degrees CA ATDC. V (30°) in equation (5) is stored in the ROM 72 in advance.

Similarly, the determination portion E1 uses, as Pc (θs) in equation (5), the cylinder pressure Pc obtained from the cylinder pressure sensor 65 for "a given cylinder" when "the crank angle θ in the given cylinder", which is separately calculated, is equal to θs (30 degrees CA BTDC). V (θs) in equation (5) is stored in the ROM 72 in advance. Further, the determination portion E1 uses, as Pc (θe), the cylinder pressure Pc obtained from the cylinder pressure sensor 65 for "a given cylinder" when "the crank angle θ in the given cylinder", which is separately calculated, is equal to θe (60 degrees CA ATDC). V(θe) in equation (5) is stored in the ROM 72 in advance.

$$MFB30 = \frac{Pc(30°) \cdot V(30°)^K - Pc(\theta s) \cdot V(\theta s)^K}{Pc(\theta e) \cdot V(\theta e)^K - Pc(\theta s) \cdot V(\theta s)^K} \qquad (5)$$

The feedback portion E2 calculates the air-fuel ratio corresponding value AFL used to make the mass fraction burned MFB30 equal to the target mass fraction burned MFB30tgt, by executing a feedback control according to a known proportional integral control (PI control). In the embodiment, the air-fuel ratio corresponding value AFL is the target air-fuel ratio. As described with reference to FIG. 4, the target mass fraction burned MFB30tgt is set to 90% in the embodiment. If the target mass fraction burned MFB30tgt is equal to or lower than 90%, the air-fuel ratio is excessively high (the air-fuel ratio is leaner than the lean limit air-fuel ratio), and therefore, the combustion may become unstable. If the mass fraction burned MFB30 is higher than 90%, it is possible to make the air-fuel ratio leaner (i.e., it is possible to further increase the air-fuel ratio) without making the combustion unstable.

Accordingly, if the mass fraction burned MFB30 is lower than 90%, the feedback portion E2 corrects the air-fuel ratio corresponding value AFL so that air-fuel ratio is richer. That is, the feedback portion E2 decreases the air-fuel ratio corresponding value AFL that is the target air-fuel ratio. If the mass fraction burned MFB30 is higher than 90%, the feedback portion E2 corrects the air-fuel ratio corresponding value AFL so that the air-fuel ratio is leaner. That is, the feedback portion E2 increases the air-fuel ratio corresponding value AFL that is the target air-fuel ratio.

The tentative load factor KLz calculated by the load factor calculation portion D3, and the target air-fuel ratio AFL calculated by the feedback portion E2 are input to the target load factor calculation portion E3. The target load factor calculation portion E3 calculates the target load factor KLtgt by substituting the input tentative load factor KLz and the target air-fuel ratio AFL into equation (6) described below.

$$KLtgt=KLz \times AFL/\text{stoich} \qquad (6)$$

Equation (6) will be described. When a cylinder intake air amount Mctgt represents the cylinder intake air amount required to achieve the target air-fuel ratio AFL that is the air-fuel ratio corresponding value AFL, the following equation (7) is satisfied.

$$AFL=Mctgt/TAU \qquad (7)$$

As evident from equation (4) (TAU=k×KLz/stoich), the relation between the target load factor KLtgt and the cylinder intake air amount Mctgt is represented by the following equation (8).

$$Mctgt=k \times KLtgt \qquad (8)$$

Based on equation (7) and equation (8), the following equation (9) is obtained.

$$KLtgt = AFL \times TAU/k \quad (9)$$

The fuel injection amount TAU is determined by the injection amount calculation portion D4 according to the above-described equation (4). Accordingly, based on equation (9) and equation (4), the above-described equation (6) is obtained.

The target pressure calculation portion E4 includes the first table that defines "the relation between the engine speed NE and the intake valve opening timing VT, and the constant value a", and the second table that defines "the relation between the engine speed NE and the intake valve opening timing VT, and the constant value b", as well as the load factor calculation portion D3. The engine speed NE, the intake valve opening timing VT, and the target load factor KLtgt calculated by the target load factor calculation portion E3 are input to the target pressure calculation portion E4.

Then, the target pressure calculation portion E4 sets the constant value a, based on the input engine speed NE, the input intake valve opening timing VT, and the first table. Similarly, the target pressure calculation portion E4 sets the constant value b, based on the input engine speed NE, the input intake valve opening timing VT, and the second table. Finally, the target pressure calculation portion E4 calculates a target intake pipe pressure Pimtgt, by substituting the set constant value a, the set constant value b, and the input target load factor KLtgt into the following equation (10) equivalent to the above-described equation (3).

$$Pimtgt = (k \times KLtgt + b)/a \quad (10)$$

The engine speed NE, the intake valve opening timing VT, and the target intake pipe pressure Pimtgt calculated by the target pressure calculation portion E4 are input to the secondary opening amount calculation portion E5. The secondary opening amount calculation portion E5 includes "a secondary opening amount calculation table" that defines a relation between "the target intake pipe pressure Pimtgt, the engine speed NE, and the intake valve opening timing VT" and "the secondary throttle valve opening amount TAtgt". The secondary opening amount calculation table is empirically set.

Then, the secondary opening amount calculation portion E5 calculates the secondary throttle valve opening amount TAtgt, by applying the input engine speed NE, the input intake valve opening timing VT, and the input target intake pipe pressure Pimtgt to the secondary opening amount calculation table. Thus, the secondary opening amount calculation portion E5 calculates the secondary throttle valve opening amount TAtgt for obtaining the cylinder intake air amount Mctgt required for achieving the above-described air-fuel ratio corresponding value AFL (the target air-fuel ratio AFL) when the fuel in the fuel injection amount TAU is supplied.

Then, the control apparatus controls the throttle valve actuator 43a so that the opening amount of the throttle valve 43 is equal to the secondary throttle valve opening amount TAtgt.

The primary opening amount setting portion D1 functions as the primary opening amount setting device B21. The pressure calculation portion D2 and the load factor calculation portion D3 function as the air amount corresponding value setting device B22. The injection amount calculation portion D4 functions as the injection amount calculation device B23. Further, the primary opening amount setting portion D1, the pressure calculation portion D2, the load factor calculation portion D3, and the injection amount calculation portion D4 constitute the injection amount setting device B2.

The determination portion E1 functions as the first index value determination device B4. The feedback portion E2 functions as the air-fuel ratio corresponding value calculation device B51. The target load factor calculation portion E3, the target pressure calculation portion E4, and the secondary opening amount calculation portion E5 constitute the secondary opening amount calculation device B52. Further, the feedback portion E2, the target load factor calculation portion E3, the target pressure calculation portion E4, and the secondary opening amount calculation portion E5 constitute the secondary opening amount setting device 135.

Also, the target load factor calculation portion E3, the target pressure calculation portion E4, and the secondary opening amount calculation portion E5 may calculate the secondary throttle valve opening amount TAtgt, using inverse models that are inverse with respect to the above-described known air models.

[Specific Control 2: Ignition Timing Control]

Figure 9:
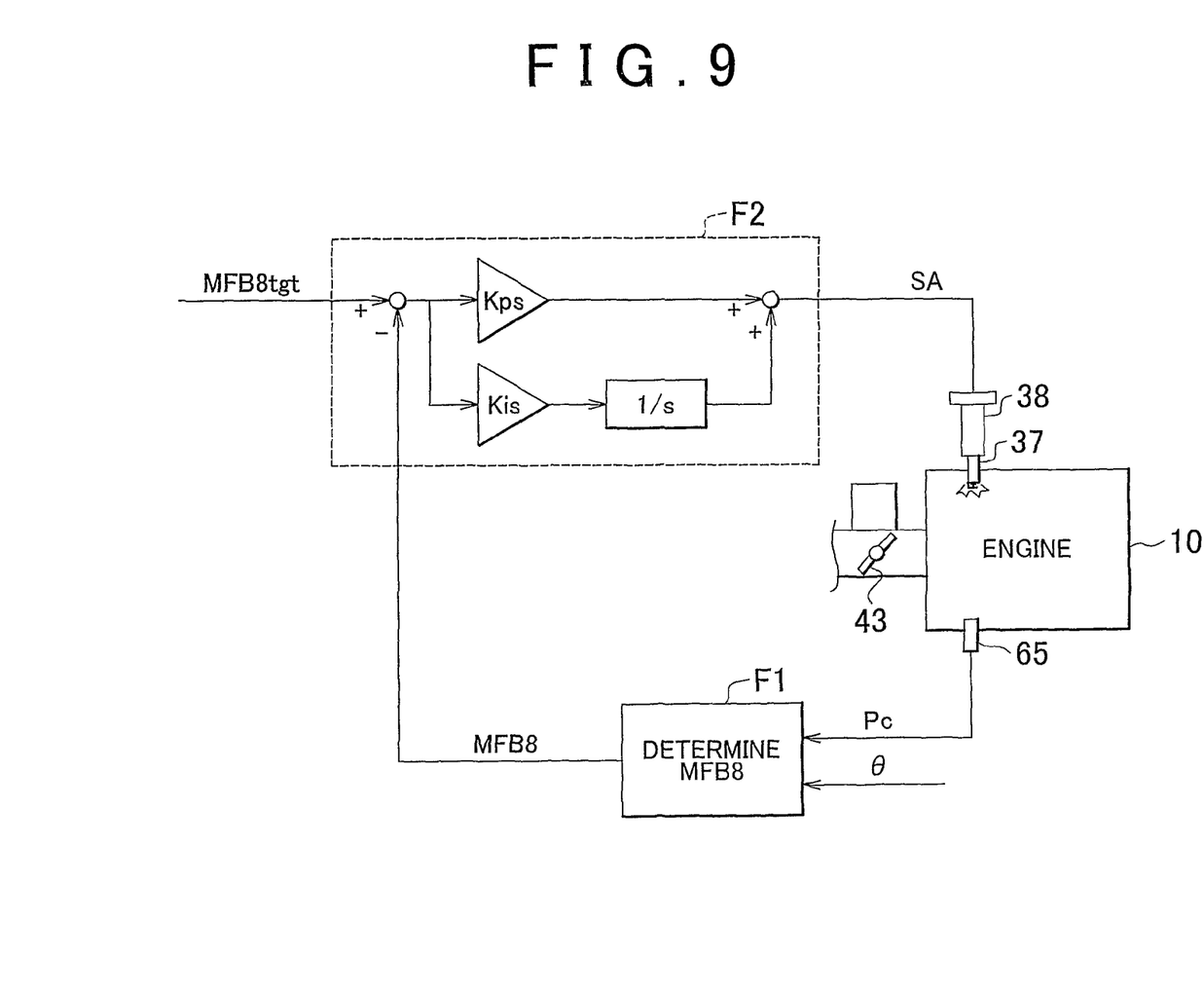
FIG. 9 is a detailed functional block diagram showing the control apparatus according to the embodiment of the invention.

Next, an actual ignition timing control executed by the control apparatus will be described in detail. FIG. 9 is a functional block diagram relating to the ignition timing control executed by the control apparatus. Hereinafter, the functions will be sequentially described.

The control apparatus includes a determination portion F1 that determines the 8-degree mass fraction burned MFB8, and an ignition timing feedback portion F2, which are used to set the ignition timing SA.

The determination portion F1 determines the 8-degree mass fraction burned MFB8 that is the second index value, according to equation (11) described below, which is set based on the above-described equation (1). At this time, the determination portion F1 uses, as Pc (8°) (that is, Pc (θ2)) in equation (11), the cylinder pressure Pc obtained from the cylinder pressure sensor 65 for "a given cylinder" when "the crank angle θ in the given cylinder", which is separately calculated based on the signals from the cam position sensor 63 and the crank position sensor 64, is 8 degrees CA ATDC. V) (8°) in equation (11) is stored in the ROM 72 in advance.

Similarly, the determination portion F1 uses, as Pc (θs) in equation (11), the cylinder pressure Pc obtained from the cylinder pressure sensor 65 for "a given cylinder" when "the crank angle θ in the given cylinder", which is separately calculated, is equal to θs (30 degrees CA BTDC). V (θs) in equation (11) is stored in the ROM 72 in advance. Further, the determination portion F1 uses, as Pc (θe), the cylinder pressure Pc obtained from the cylinder pressure sensor 65 for "a given cylinder" when "the crank angle θ in the given cylinder", which is separately calculated, is equal to θe (60 degrees CA ATDC). V(θe) in equation (11) is stored in the ROM 72 in advance.

$$MFB8 = \frac{Pc(8°) \cdot V(8°)^K - Pc(\theta s) \cdot V(\theta s)^K}{Pc(\theta e) \cdot V(\theta e)^K - Pc(\theta s) \cdot V(\theta s)^K} \quad (11)$$

The ignition timing feedback portion F2 calculates the ignition timing SA used to make the mass fraction burned MFB8 equal to the target mass fraction burned MFB8tgt, by executing a feedback control according to a known proportional integral control (PI control). The target mass fraction burned MFB8tgt is set to 50% in the embodiment. The target mass fraction burned MFB8tgt may be changed according to an operating state amount. The target mass fraction burned MFB8tgt is set to a value at which the combustion efficiency of the engine is high, amounts of discharged HC, CO, and the like are small, and for example, torque fluctuation due to knocking does not occur.

Then, the control apparatus transmitting an ignition signal (ignition instruction signal) to the igniter 38 so that the ignition plug 37 generates a spark at the ignition timing SA calculated by the ignition timing feedback portion F2. As a result, when there is manufacturing variation among the engines 10, the control apparatus executes the control so that the ignition is performed at the ignition timing SA at which the maximum torque is generated in each engine 10. That is, with the control apparatus, it is possible to control the air-fuel ratio of the air-fuel mixture to the lean limit air-fuel ratio, while maintaining the stable combustion state, and to efficiently combust the air-fuel mixture, when there is individual variation among the engines 10.

The determination portion F1 functions as the second index value determination device C1. The ignition timing feedback portion F2 functions as the ignition timing control device C2.

As described above, with the control apparatus, the fuel injection amount TAU, which is the amount of the fuel contributing to the combustion, is not decreased when the air-fuel ratio is changed to a leaner air-fuel ratio. This avoids the situation where the driver feels discomfort due to a relatively large decrease in the torque generated by the engine. Further, when it is not possible to accurately estimate the amount of air taken into the cylinder, for example, during transient operation of the engine, it is possible to make the air-fuel ratio leaner (increase the air-fuel ratio) while reducing the fluctuations in the torque generated by the engine, because the throttle valve opening amount is controlled so that the first index value (the first mass fraction burned MFB$\theta$1) is equal to the first target index value (the first target mass fraction burned MFB$\theta$1tgt).

The invention is not limited to the above-described embodiment. Modifications to the embodiment may be made that still fall within the scope of the invention. For example, in the above-described embodiment, the mass fraction burned MFB (accordingly, a heat amount ratio Qsum/Qtotal) is determined based on the pressure in the cylinder. However, the mass fraction burned MFB may be determined using a combustion model (for example, refer to Japanese Patent Application Publication No. 2006-9720 (JP-A-2006-9720)) called the Wiebe function as shown in the above-described equation (2). Also, in the above-described embodiment, the ignition timing feedback control is executed based on the mass fraction burned MFB$\theta$. However, the ignition timing feedback control need not necessarily be executed.

Also, the intake valve opening timing VT may be changed based on the operating state of the engine 10 (for example, the target load factor KLtgt, the engine speed NE, and the like), or may be constant. If the intake valve opening timing VT is constant, the intake valve opening timing VT need not necessarily be input to the pressure calculation portion D2, the load factor calculation portion D3, the target pressure calculation portion E4, the secondary opening amount calculation portion E5, and the like. In this case, each of the calculation portions calculates the value that needs to be determined, without using the intake valve opening timing VT. Further, the first crank angle $\theta$1 is not limited to 30 degrees CA ATDC. Similarly, the second crank angle $\theta$2 is not limited to 8 degrees CA ATDC.

Further, the above-described injection amount setting device 132 may calculate torque required of the engine (required engine torque) based on at least the determined accelerator-pedal operation amount PA (preferably, based on the determined accelerator-pedal operation amount PA and the determined engine speed NE), using a predetermined table or the like, and may set the fuel injection amount TAU to a fuel amount required for the engine 10 to generate the required engine torque.

The invention claimed is:

1. A control apparatus for an internal combustion engine, comprising:
    an accelerator operation amount determination device that determines an accelerator operation amount;
    an injection amount setting device that sets a fuel injection amount based on the determined accelerator operation amount;
    a fuel injection device that injects fuel in the set fuel injection amount;
    a first index value determination device that determines a first index value, which indicates a progression degree of combustion of an air-fuel mixture in a cylinder of the engine when a crank angle of the internal combustion engine is equal to a predetermined first crank angle;
    a secondary opening amount setting device that sets a secondary throttle valve opening amount that is a final target value of an opening amount of a throttle valve, to make the determined first index value equal to a first target index value; and
    a throttle valve control device that controls the throttle valve so that the opening amount of the throttle valve is equal to the set secondary throttle valve opening amount.

2. The control apparatus according to claim 1, wherein:
    the injection amount setting device includes:
    a primary opening amount setting device that sets a primary throttle valve opening amount so that the primary throttle valve opening amount is increased as the determined accelerator operation amount increases;
    an estimation device that estimates an air amount corresponding value, which is a value corresponding to an amount of air taken into the cylinder of the engine on an assumption that the opening amount of the throttle valve is equal to the primary throttle valve opening amount; and
    an injection amount calculation device that calculates the fuel injection amount so that an air-fuel ratio of the air-fuel mixture in the cylinder is equal to a primary target air-fuel ratio on an assumption that the air in an amount corresponding to the estimated air amount corresponding value is taken into the cylinder; and
    the secondary opening amount setting device includes:
    an air-fuel ratio corresponding value calculation device that calculates an air-fuel ratio corresponding value, which is a value corresponding to a secondary target air-fuel ratio used to make the determined first index value equal to the first target index value; and
    a secondary opening amount calculation device that calculates the secondary throttle valve opening amount, based on a value corresponding to the calculated fuel injection amount, and the determined air-fuel ratio corresponding value.

3. The control apparatus according to claim 1, wherein the first index value is an actual mass fraction burned when the crank angle of the internal combustion engine is equal to the predetermined first crank angle.

4. The control apparatus according to claim 1 wherein the first target index value is a mass fraction burned corresponding to a desired lean air-fuel ratio when the crank angle of the internal combustion engine is equal to the predetermined first crank angle.

5. The control apparatus according to claim 3, wherein the first crank angle is a crank angle after a compression top dead center of a combustion stroke of the cylinder.

6. The control apparatus according to claim 1 further comprising:
a second index value determination device that determines a second index value that indicates the state of combustion of the air-fuel mixture in the cylinder of the engine; and
an ignition timing control device that controls an ignition timing so that the second index value is equal to a second target index value.

7. The control apparatus according to claim 6, wherein the second index value is an actual mass fraction burned when a crank angle of the internal combustion engine is equal to a second crank angle that is advanced relative to the first crank angle.

8. The control apparatus according to claim 6, wherein the second target index value is a mass fraction burned at which a maximum torque is generated by the internal combustion engine.

9. The control apparatus according to claim 6 further comprising:
a cylinder pressure sensor that detects a pressure in the cylinder, wherein the first index value and the second index value are calculated based on the pressure in the cylinder.

10. The control apparatus according to claim 6 wherein the first index value and the second index value are calculated based on a Wiebe function.

11. The control apparatus according to claim 1 wherein the injection amount setting device sets the fuel injection amount required for the engine to generate required torque, which is set based on the accelerator operation amount.

12. The control apparatus according to claim 2 wherein the air amount corresponding value is a value obtained by dividing the amount of the air taken into the cylinder, by a maximum volume of the cylinder.

13. The control apparatus according to claim 2 wherein that the air-fuel ratio corresponding value is calculated based on the secondary target air-fuel ratio, or an air-fuel ratio correction value used to make the air-fuel ratio equal to the secondary target air-fuel ratio.

14. A control method for an internal combustion engine, comprising:
determining an accelerator operation amount;
setting a fuel injection amount based on the determined accelerator operation amount;
injecting fuel in the set fuel injection amount;
determining a first index value that indicates a state of combustion of an air-fuel mixture in a cylinder of the engine;
setting a first target index value that is a target value of the first index value;
setting a secondary throttle valve opening amount that makes the determined first index value equal to the first target index value, wherein the secondary throttle valve opening amount is a final target value of an opening amount of a throttle valve; and
controlling the throttle valve so that the opening amount of the throttle valve is equal to the set secondary throttle valve opening amount.

15. The control method according to claim 14, further comprising:
setting a primary throttle valve opening amount based on the accelerator operation amount;
estimating an air amount corresponding value, which is a value corresponding to an amount of air taken into the cylinder of the engine when the opening amount of the throttle valve is equal to the primary throttle valve opening amount; and
calculating the fuel injection amount so that an air-fuel ratio of the air-fuel mixture in the cylinder is equal to a primary target air-fuel ratio, when the air in an amount corresponding to the estimated air amount corresponding value is taken into the cylinder; and
calculating an air-fuel ratio corresponding value, which is a value corresponding to a secondary target air-fuel ratio used to make the determined first index value equal to the first target index value; and
calculating the secondary throttle valve opening amount based on the calculated fuel injection amount, and the determined air-fuel ratio corresponding value.

16. The control method according to claim 15, further comprising:
calculating a pressure in an intake pipe at a position downstream of an intake valve, based on the primary throttle valve opening amount and an engine speed; and
estimating the air amount corresponding value, based on the calculated pressure in the intake pipe and the engine speed.

17. The control apparatus according to claim 4, wherein the first crank angle is a crank angle after a compression top dead center of a combustion stroke of the cylinder.

* * * * *